(12) United States Patent
Patterson

(10) Patent No.: US 7,794,596 B2
(45) Date of Patent: Sep. 14, 2010

(54) METHOD AND APPARATUS FOR WASTE WATER TREATMENT

(75) Inventor: Robert Maurice Charles Patterson, Tasmania (AU)

(73) Assignee: International Environmental Solutions Pty Ltd (AU)

( * ) Notice: Subject to any disclaimer, the term of this patent is extended or adjusted under 35 U.S.C. 154(b) by 193 days.

(21) Appl. No.: 12/084,220

(22) PCT Filed: Apr. 11, 2006

(86) PCT No.: PCT/IB2006/051093

§ 371 (c)(1), (2), (4) Date: Apr. 28, 2008

(87) PCT Pub. No.: WO2007/049160

PCT Pub. Date: May 3, 2007

(65) Prior Publication Data

US 2009/0127189 A1    May 21, 2009

(30) Foreign Application Priority Data

Oct. 28, 2005   (AU) .............................. 2005905967

(51) Int. Cl.
  C02F 3/04   (2006.01)
  C02F 3/10   (2006.01)
(52) U.S. Cl. ................ 210/602; 210/603; 210/617; 210/620; 210/150; 210/259
(58) Field of Classification Search ............... 210/601, 210/602, 603, 614, 615, 616, 617, 620–623, 210/141, 143, 150, 151, 167.01, 195.1, 252, 210/259

See application file for complete search history.

(56) References Cited

U.S. PATENT DOCUMENTS

| 3,827,679 | A | * | 8/1974 | Kaelin | 261/91 |
|---|---|---|---|---|---|
| 4,039,451 | A | | 8/1977 | Smith | 210/170 |
| 4,162,976 | A | * | 7/1979 | Monson | 210/170.08 |
| 4,448,690 | A | * | 5/1984 | Maphis | 210/609 |
| 5,527,454 | A | | 6/1996 | Ponte et al. | 210/151 |
| 5,587,080 | A | * | 12/1996 | Landine et al. | 210/603 |
| 5,626,755 | A | * | 5/1997 | Keyser et al. | 210/614 |
| 5,679,252 | A | | 10/1997 | Gotou et al. | 210/614 |
| 5,702,593 | A | * | 12/1997 | Horsley et al. | 210/122 |
| 5,871,647 | A | * | 2/1999 | Lord | 210/615 |
| 5,906,745 | A | * | 5/1999 | Eto | 210/601 |
| 6,024,875 | A | * | 2/2000 | Sevic | 210/614 |
| 6,270,661 | B1 | * | 8/2001 | Jowett | 210/151 |
| 6,428,691 | B1 | * | 8/2002 | Wofford | 210/151 |

(Continued)

FOREIGN PATENT DOCUMENTS

AU    2003248012    4/2004

(Continued)

*Primary Examiner*—Fred Prince
(74) *Attorney, Agent, or Firm*—Kusner & Jaffe

(57) ABSTRACT

A method for treating wastewater wherein the wastewater is introduced in prescribed doses of wastewater to a first treatment zone, establishing a negative pressure gradient using mechanical ventilation within said zone causing exhaust air flow to remove gases and promote evaporation in the zone. Excess wastewater passing through the zone is collected and reintroduced. The zone contains particulate material with a large wetted surface area covered in a microbiological slime layer.

42 Claims, 2 Drawing Sheets

Appendix I

U.S. PATENT DOCUMENTS

| | | | |
|---|---|---|---|
| 6,974,536 B2 | 12/2005 | Chaffee | 210/85 |
| 2004/0007523 A1* | 1/2004 | Gabon et al. | 210/605 |
| 2004/0134853 A1* | 7/2004 | Miller, III | 210/603 |

FOREIGN PATENT DOCUMENTS

| | | |
|---|---|---|
| EP | 0104525 | 4/1984 |
| GB | 2077712 | 12/1981 |
| JP | 11-156340 | 6/1999 |
| RU | 2106315 | 3/1998 |

* cited by examiner

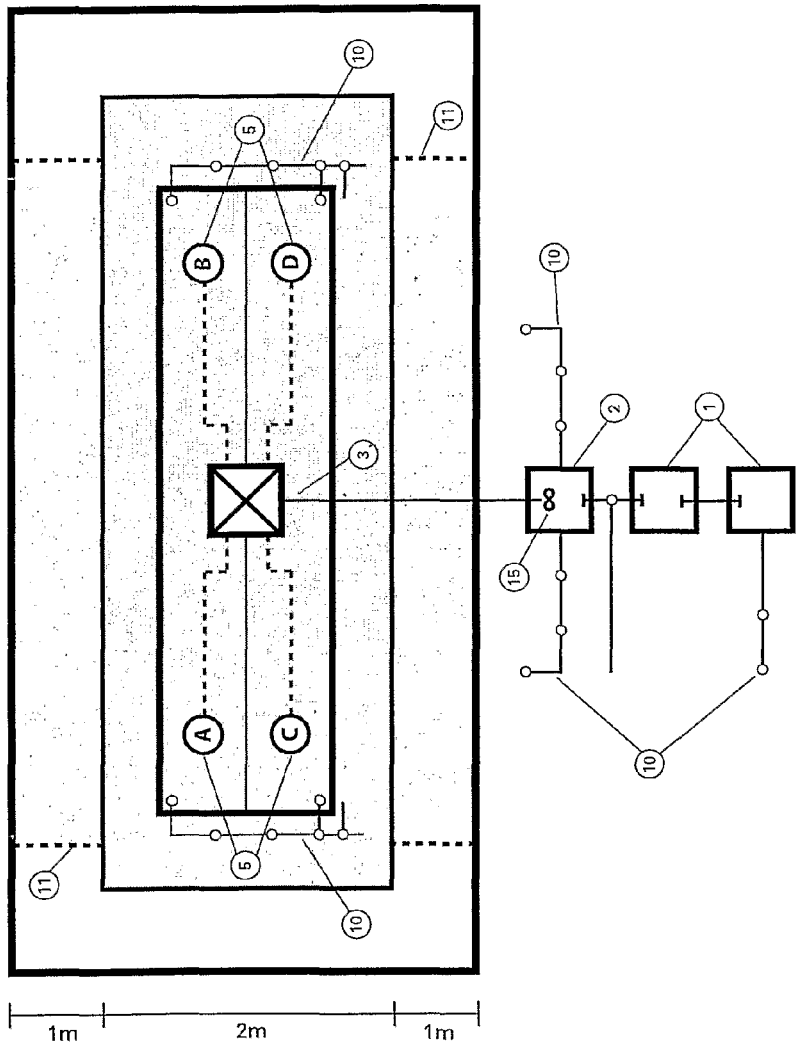

METHOD AND APPARATUS FOR WASTE WATER TREATMENT

TECHNICAL FIELD

The present invention relates to the field of waste water treatment. In particular the present invention relates to a method and apparatus for accelerating a disposal process for waste water. In one form the present invention relates to a system for on-site domestic and commercial wastewater and storm water management and it will be convenient to hereinafter describe the invention in relation to that use. However, it should be appreciated that the present invention is not singularly limited to that use.

BACKGROUND ART

The discussion throughout this specification comes about due to the realisation of the inventor and/or the identification of certain prior art problems by the inventor.

The on-site treatment and disposal of commercial and domestic sewage and other wastewater such as storm water has been prohibited in many areas due to shallow or non absorptive soils and other site limitations such as high water tables, shallow rock and high rainfall. These conditions have prevented the use of conventional ground absorption trenches and evapotranspiration systems. The inability to effectively treat and dispose of wastewater on-site has restricted development to those areas that are serviced by conventional sewerage systems. However it is clearly evident that recent natural disaster events throughout the world such as earthquakes, hurricanes, tsunamis and the like have dramatically shown that even areas serviced by conventional off-site sewage systems require on-site treatment and disposal of waste water from time to time.

In the past the problems associated with on-site disposal techniques such as non-absorbent soils, high water tables and large volumes (site limitations) have not been effectively solved. The inventor has realised that an issue to be addressed is determining how can the treatment mechanisms that enable the on-site systems to operate be protected from the affects of site limitations.

One attempt at alleviating the limitations noted above comprises the installation of pump-out septic systems that consist of large wastewater holding tanks that collect all wastewater for removal off site by road tankers for transport to sewerage treatment plants. This however, is quite inefficient and unwieldy.

The early 1980's saw the introduction of the Aerated Wastewater-treatment System (AWTS) in Tasmania and a number of Australian mainland states. AWTS were originally designed to fit into large wastewater holding tanks. AWTS produced chlorinated wastewater that was approved for surface disposal onto prescribed garden beds. AWTS solved the high cost associated with the use of pump out road tankers however, other problems with the wide spread use of AWTS became apparent. These include the AWTS' need for frequent expert maintenance, increasing purchase and running costs and a serious health concern related to the surface disposal of chlorine treated sewage near houses that are a source for communicable diseases. AWTS require an additional irrigation area of several hundred square metres to evaporate or absorb the AWTS treated effluent. The size of the AWTS is dependant on climatic and soil factors with cooler regions generally requiring larger areas.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

An earlier device created by the inventor was the Field Septic Disposal System, which is the subject of an Australian Standard Patent, dated 29 Jan. 1991, Number PK4340. This device forms the basis for the primary stage of the present invention.

SUMMARY OF INVENTION

An object of the present invention is to alleviate at least one disadvantage associated with the prior art.

The present invention provides in one aspect a method of accelerating a disposal process for waste water comprising the step of:

introducing at least one predetermined amount of waste water to one of:
    a first waste water treatment zone;
    at least one second waste water treatment zone.

In another aspect the present invention provides apparatus for accelerating a disposal process for waste water comprising:

fluid distribution means for introducing at least one predetermined amount of waste water to one of:
    a first waste water treatment zone;
    at least one second waste water treatment zone.

In a further aspect the present invention provides a method of accelerating a disposal process for waste water comprising the step of:

establishing a negative air pressure gradient within a first waste water treatment zone thereby causing exhaust air flow to remove waste gases from within the first treatment zone.

In yet another aspect the present invention provides apparatus for accelerating a disposal process for waste water comprising:

first ventilation means operatively associated with a first waste water treatment zone for establishing a negative air pressure gradient within the first treatment zone thereby causing exhaust air flow for the removal of waste gases from within the first treatment zone.

In still another aspect the present invention provides a method of accelerating a disposal process for waste water comprising the steps of:

collecting excess waste water from a first waste water treatment zone to a collection chamber;

reintroducing waste water from the collection chamber to one of:
    the first waste water treatment zone;
    at least one second waste water treatment zone.

In yet a further aspect the present invention provides apparatus for accelerating a disposal process for waste water comprising:

collecting means for collecting excess waste water from a first waste water treatment zone to a collection chamber;

reintroducing means for reintroducing waste water from the collection chamber to one of:
    the first waste water treatment zone;
    at least one second waste water treatment zone.

The problems that have prevented the use of conventional ground absorption trenches and evapotranspiration systems are overcome by the present invention, which removes the effects of site limitations from restricting the function of natural treatment and disposal mechanisms.

The core treatment zone provides conditions suitable for the natural treatment and disposal processes to operate and most of the remaining wastewater is removed by evaporation. The process of evaporation may be enhanced through the provision of mechanical ventilation to remove waste gases that may comprise humid or stagnant air from within the core treatment zone. A recycling capability via collection drains positioned at the base of the core treatment zone allows any excess treated wastewater to be returned to the dosing chamber for reintroduction of the waste water to the treatment zone to maximise the efficiency of the treatment process.

Other aspects and preferred aspects are disclosed in the specification and/or defined in the appended claims, forming a part of the description of the invention.

In essence, the present invention stems from the realisation that the treatment of waste water may be greatly enhanced by the injection of prescribed doses of pretreated primary wastewater into a well ventilated elevated core treatment zone that has been designed to avoid the problems of site limitations and enhance the evaporation process including a recycling capability.

The present invention has been found to result in numerous advantages, such as:

In ground site limitations such as shallow or non absorbent soils, high water tables or shallow rock are prevented from impacting on the natural treatment and disposal mechanisms by the provision of a core treatment zone that is elevated above the natural ground surface.

The above ground site limitation of high rainfall is prevented from impacting on the natural treatment disposal mechanisms by providing an impervious barrier that protects the core treatment zone by preventing rainfall or other sources of naturally occurring water from entering the core treatment zone.

The present system differs from conventional AWTS in that much of the hydraulic component of the wastewater is removed through evaporation.

The present system differs from holding tank systems in that large volumes of wastewater may be treated and disposed of on-site.

Extensive maintenance services are not required.

The prescribed material that comprises the core treatment zone provides a far greater potential wetted surface area to significantly enhance evaporation potential.

Low installation and maintenance costs compared to AWTS. (50% installation and 5% maintenance costs compared to AWTS.

Chemical disinfection is not required.

Approximately 1/10 of a site area is required compared to AWTS.

Lower costs (Installation and Maintenance) compared to AWTS.

Smaller site area requirements for large volumes of wastewater or storm water. For example, an area 20 m by 4 m will treat up to 5000 per day. (equivalent to approximately SIX residential houses).

The present system may treat and dispose of commercial or domestic sewage and other wastewater in areas that have site limitations that would normally prevent the use of conventional ground absorption trenches and evapotranspiration systems.

Effectively treats commercial and domestic sewage and other wastewater by providing an ideal environment for the natural treatment and disposal mechanisms to operate in.

Protected from rainfall infiltration by an impervious barrier positioned to protect either the core or perimeter (peripheral) treatment zones.

High phosphorus and nitrogen removal.

High Biochemical/Biological Oxygen Demand (BOD) and suspended solids removal.

High levels of heavy metals are removed.

Very long life achievable.

Requires negligible maintenance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention, and in which:

FIG. 2 illustrates a plan view of the preferred embodiment of FIG. 1.

DETAILED DESCRIPTION

Figure 1:
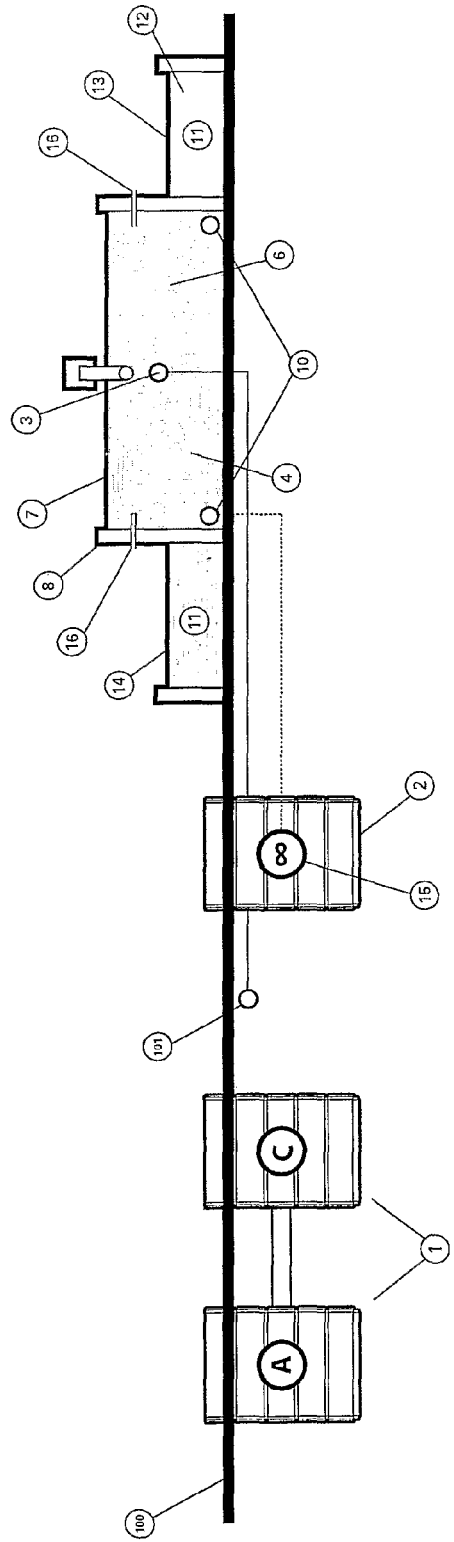
FIG. 1 illustrates a cross sectional elevation of a preferred embodiment of the present invention.

The term "waste water" as herein used refers to residential, domestic, commercial and/or industrial liquid waste comprising biological material and may, for example, comprise one or more of sewage material, storm water and grey water such as, for example, laundry and/or bathroom waste also referred to as sullage. Furthermore the term "waste gases" may be taken to refer to gases comprising gaseous products of waste water and/or humid or stagnant gas or gases, for example, stagnant or humid air that may accumulate in proximity to waste water.

The present invention, in a preferred form, may be used in conjunction with a Field Septic Disposal System (FSDS) that provides primary and/or secondary treatment of human body waste, as disclosed in Australian patent no. 661468 in the name of Robert Maurice Charles Patterson, which disclosure is included herein by reference in its entirety.

The present invention, in its preferred form, provides a combination of providing conditions to encourage and sustain the natural biological treatment mechanisms to operate free from site limitations and an enhanced ability to evaporate the hydraulic component of the wastewater. The enhanced ability to evaporate effectively minimizes the wastewater volume to be treated. The recycling capability of preferred embodiments of the present invention allows for the automatic return of any wastewater that remains after the initial treatment. This facility effectively manages greater than design loads which may occur from time to time.

In a general application of the present invention, according to a preferred embodiment, sewage wastewater may be pretreated in an appropriately sized FSDS (as described in Australian patent no. 661468) and which has been fitted with an outlet filter. Equally, waste water that has been subjected to primary treatment, as would be understood by the person skilled in the art, may suffice as pretreated waste water for the purposes of this description. Pretreated FSDS or otherwise pretreated waste water or effluent is then mixed with other wastewater such as storm water or other grey water in a FSDS wastewater holding chamber. Combined FSDS and other wastewater is then injected under pressure and preferably in prescribed doses into a distribution line located in the top portion of a first (core) treatment zone. In a preferred embodiment a portion of, or the entire core treatment zone may be elevated above the natural ground surface to assist in alleviating previously described site limitations. The core treatment zone may be divided into or otherwise comprise several second treatment zones. Each treatment zone may receive a prescribed dose of waste water for treatment on a rotating basis. A ventilation conduit may be positioned above the distribution line and is preferably fitted with a prescribed mechanical ventilator. The mechanical ventilator creates a negative pressure gradient in the core treatment zone that causes air flow inwards from ventilated sides of the core treatment zone to remove humid or stagnant air from within the core treatment zone. The core treatment zone may also provide the required wetted surface to facilitate the development and operation of natural treatment and disposal mechanisms that effectively treat the wastewater pathogens and significantly reduce or eliminate Biochemical/Biological Oxygen Demand (BOD), suspended solids, phosphorus, nitrogen and heavy metals. The core treatment zone may also be fitted with an upper and base impervious liner(s) that are positioned to protect the core treatment zone from the effects of site limiting factors such as non-absorbent or shallow soils, high water tables, shallow rock and high rainfall. The core treatment zone is also preferably fitted with a drainage system that automatically returns any partially treated wastewater back into the wastewater collection chamber for re-injection to the treatment zones. Perimeter treatment zones may surround the core treatment zone and are designed to facilitate evapotranspiration and nutrient uptake by plants to provide further treatment and disposal if required. A more detailed description follows with reference to the preferred embodiment as shown in the drawings.

Referring to FIG. 1 primary treated wastewater (pretreated sewage wastewater having undergone sedimentation, flotation and anaerobic digestion) from a FSDS system 1 is combined with other wastewater 101 in a collection/dosing chamber 2 and injected under pressure in at least one predetermined amount, preferably in prescribed doses into a distribution line 3 located in the upper portion of the core treatment zone 4. The collection chamber 2 may in a convenient form be a modular chamber identical in structure to a FSDS chamber 1 that does not take part in the primary treatment that ordinarily would occur in a FSDS chamber 1. The injection is performed by pumping means 15 either by a small electric pump or, in remote locations without electricity, by a small petrol or diesel-driven pump or its equivalent.

As shown more clearly with reference to FIG. 2 the distribution line 3 enables the wastewater to be evenly distributed along the entire length of each second treatment zone 5 labelled as "A", "B", "C" and, "D", within the core treatment zone 4. Each second treatment zone 5 is dosed on a rotating basis. A prescribed dose of about 200 L is a convenient volume and has proven successful in trial installations where a permanent power supply is provided. The permanent power supply enables a submersible pump 15 to be activated when, for example, 200 L has passed through the primary treatment FSDS chamber(s) 1 and is ready for injection into the core treatment zone 4. Other wastewater 101 for example sullage water (grey water) which may not necessarily require primary treatment may enter the system as shown at 101 of FIG. 1. Returned unprocessed wastewater from the treatment zones 4, 5 or 11 may also be returned into the pump chamber 2 as shown in FIG. 1.

Preferably between four and five 200 L doses may occur each for a typical house that will generate approximately 900 L of wastewater (toilet wastewater and sullage) each day. The prescribed doses may occur as the wastewater is generated, however a periodic resting time between doses allows for evaporation and movement over prescribed material 6 in the core treatment zone 4. This process is more efficient than simple gravity flows of wastewater entering an absorption trench at a single point (the end of the drain) as in conventional systems. The inventor has found that a far greater surface area may be provided by pressure dosing the entire length of the core treatment zone 4 resulting in accelerated evaporation of the wastewater.

A 200 L dose may not necessarily be used in remote non powered sites such as for forestry facilities. In such remote applications, power may be provided by a portable petrol driven pump 15 on a weekly basis to pump a greater dose, preferably about 7,000 L to 8,000 L that may be evenly distributed throughout the core treatment zone 4. In a preferred embodiment for these remote applications, no further wastewater is introduced into the core treatment zone for at least another 7 days during which time the greater wastewater volume will have been processed.

The core treatment zone 4 comprises prescribed material 6 that provides the required wetted surface for treating the waste water. Wetted surface calculations are dependant on the design load, average monthly temperatures and evaporation rates. The size of the prescribed material in the core treatment zone is important and the material preferably comprises rocks. In trial installations it has been shown by the inventor that if 20 mm to 50 mm clean Boral™ Aggregate (crushed rock) in a 20 m by 2 m by 0.6 m core treatment zone 4 is used, the specific surface area available as an evaporative surface is 21,600 $m^2$. A preferred material 6 has about 50% of its volume being air and the particle density is 2.9. Such a material provides for about 0.500 $m^2/kg$. A number of 20 m core treatment zone 4 systems have demonstrated that wastewater loadings of up to about 5000 L each day may be processed. Different types of prescribed material 6 may be considered for use in the core treatment area 4 design if similar areas of evaporative surface with about 50% air voids can be achieved. The prescribed material 6, in particular its wetted surface area, situated in the core treatment zone 4 provides conditions suitable for the natural bio-organic treatment and disposal processes to operate and most of the remaining wastewater is removed by evaporation. The process of evaporation is assisted by the heat created by the bio-organic process combined with the vast wetted surface area provided by the prescribed material 6 and is enhanced through the provision of mechanical ventilation 9 to remove humid or stagnant air from within the core treatment zone 4.

The core treatment zone 4 is protected from rainwater infiltration by positioning an impervious barrier 7 along the top and partially down the sides of the prescribed material 6. The impervious barrier 7 may be positioned to deflect rainwater and also may allow adequate air circulation to enable gas exchange and evaporation losses throughout the core treatment zone 4. Suitable materials for the impervious barrier serve the purpose of preventing the ingress of moisture and may comprise plastics such as builder's plastics or clear plastic roofing sheets. An example builder's plastic may comprise black Forticon™ or readily available orange builder's plastic as would be known by the person skilled in the art. In the case of clear plastic roofing sheets, these may be utilised to protect the top of the core treatment zone and furthermore, may assist the treatment process itself by way of heating the core treatment zone in accordance with a glass house effect.

If required for the protection of ground water, an impervious barrier 7 may also be placed under the core treatment zone 4 and the perimeter treatment zones 11.

The core treatment zone 4 is supported by a suitable structure 8. The suitable structure is designed to support the prescribed material 6 and allow the side entry of adequate volumes of air through ventilation means in the form of air inlets 16 to enable gas exchanges and evaporation losses throughout the core treatment zone 4. The ventilation means may further comprise the mechanical ventilator 9 and also a ventilation conduit (not shown) that cooperates with the mechanical ventilator 9 to remove waste gases from the core treatment zone 4. The process of evaporation may be enhanced through the provision of the mechanical ventilation 9 to remove humid or stagnant air from within the core treatment zone.

A collection drainage system 10 is also positioned around the perimeter base that automatically returns any partially treated wastewater back into the wastewater collection/dosing chamber 2.

An additional perimeter treatment zone 11 comprising sandy top soil 12 is provided to facilitate evapotranspiration and nutrient uptake by suitable plants 13 (ie drought tolerant) to provide further treatment and disposal if required. The perimeter treatment zone 11 may receive excess waste water collected by the drainage system 10. In circumstances where the planting of suitable plants 13 is not an option the perimeter treatment zone 11 may use further prescribed material 6 and may also be fitted with an impervious barrier 14.

Microprocessor control may be utilised to control apparatus of the present invention and in a preferred form the present invention may provide apparatus adapted to accelerate a disposal process for waste water, said apparatus comprising:

processor means adapted to operate in accordance with a predetermined instruction set, said apparatus, in conjunction with said instruction set, being adapted to perform any one or more of the method steps as disclosed herein. Furthermore, the present invention in a preferred form may provide a computer program product comprising:

a computer usable medium having computer readable program code and computer readable system code embodied on said medium for accelerating a disposal process for waste water within a data processing system, said computer program product comprising:

computer readable code within said computer usable medium for performing any one or more of the method steps as disclosed herein. In this preferred form the computer control of apparatus of the present invention may be controlled remotely via a computer network such as the Internet.

The component parts of the apparatus of the present invention may preferably be provided in kit form for construction on site.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The claims defining the invention are as follows:

1. A method of accelerating a disposal process for waste water, said method comprising the steps of:
providing a first waste water treatment zone and at least one second waste water treatment zone, each of said zones comprised of a material for absorbing and evaporating a waste water, said first waste water treatment zone disposed in a structure having an upper liner, a lower liner and air inlets extending through sides of said structure, said upper liner for protecting said first waste water treatment zone from rainwater and atmospheric moisture, and said lower liner for protecting said first waste water treatment zone from groundwater; and
introducing a waste water into said first waste water treatment zone at a predetermined rate wherein a portion of said waste water evaporates in said first waste water treatment zone and is conveyed out of said first waste water treatment zone through said air inlets and wherein said waste water is derived from waste which has been subject to a primary pretreatment process to separate solids in said waste from waste water in said waste.

2. The method of claim 1 further comprising the step of: distributing the introduced at least one predetermined amount of waste water to each of a plurality of said second treatment zones.

3. The method of claim 2 wherein the step of distributing is performed on a rotational basis.

4. The method of claim 1 wherein at least one of the steps further comprises respectively introducing and distributing the at least one predetermined amount of waste water under pressure.

5. The method of claim 1 comprising the step of: establishing a negative air pressure gradient within the first waste water treatment zone thereby causing exhaust air flow to remove waste gases from within the first treatment zone.

6. The method of claim 5 further comprising the step of:
peripherally ventilating the first treatment zone to allow external airflow into the first treatment zone under the negative air pressure gradient.

7. The method of claim 5 wherein the negative air pressure gradient is established by mechanical ventilation means.

8. The method of claim 1 comprising the steps of:
collecting excess waste water from the first waste water treatment zone to a collection chamber;
reintroducing waste water from the collection chamber to one of:
the first waste water treatment zone;
at least one second waste water treatment zone.

9. The method of claim 8 wherein the step of reintroducing further comprises reintroducing at least one predetermined amount of waste water from the collection chamber.

10. The method of claim 9 wherein the step of reintroducing further comprises reintroducing at least one predetermined amount of waste water from the collection chamber under pressure.

11. The method of claim 1 wherein the first treatment zone comprises a portion of a secondary waste water treatment system.

12. The method of claim 1 wherein the predetermined amount of waste water comprises a dose of waste water comprising a volume in the range of about 200 liters to about 8000 liters.

13. The method of claim 12 wherein the dose is repeated in a cycle ranging from about 4 times a day to about once every 7 days.

14. The method of claim 1 wherein storm water and grey water are also treated along with the waste water.

15. The method of claim 1 wherein the first treatment zone further comprises one or more second treatment zones.

16. An apparatus adapted to accelerate a disposal process for waste water, said apparatus comprising:
processor means adapted to operate in accordance with a predetermined instruction set,
said apparatus, in conjunction with said instruction set, being adapted to perform the method as claimed in claim 1.

17. A computer program product comprising:
a computer usable medium having computer readable program code and
a computer readable system code embodied on said medium for accelerating a disposal process for waste water within a data processing system, said computer program product comprising:
a computer readable code within said computer usable medium for performing the method steps of claim 1.

18. The method of claim 1 wherein the first waste water treatment zone comprises a core treatment zone having a prescribed material with wetted surfaces for sustaining biological processes to treat wastewater.

19. The method of claim 18 wherein the prescribed material comprises an aggregate material.

20. The method of claim 19 wherein the aggregate has a volume of about 50% air.

21. The method of claim 20 wherein the prescribed material comprises crushed rock.

22. An apparatus for accelerating a disposal process for waste water, said apparatus comprised of:
a first waste water treatment zone comprised of a material for absorbing and evaporating a waste water, said first waste water treatment zone disposed in a structure having an upper liner, a lower liner and air inlets extending through sides of said structure, said upper liner for protecting said first waste water treatment zone from rainwater and atmospheric moisture and said lower liner for protecting said first waste water treatment zone from groundwater;
at least one second waste water treatment zone comprised of a material for absorbing and evaporating a waste water; and
a fluid distribution means for introducing at least one predetermined amount of waste water from a primary pretreatment process into said first waste water treatment zone or into said second waste water treatment zone.

23. The apparatus of claim 22 wherein the fluid distribution means comprises a fluid propulsion means for introducing the at least one predetermined amount of waste water under pressure.

24. The apparatus of claim 22 wherein the fluid distribution means further comprises flow path means operatively connected to the treatment zones for distributing the at least one predetermined amount of waste water thereto.

25. The apparatus of claim 22 further comprising:
first ventilation means operatively associated with the first waste water treatment zone for establishing a negative air pressure gradient within the first treatment zone thereby causing exhaust air flow for the removal of waste gases from within the first treatment zone.

26. The apparatus of claim 25 further comprising:
second ventilation means positioned peripherally to the first treatment zone for providing thereat external airflow into the first treatment zone under the negative air pressure gradient.

27. The apparatus of claim 26 further comprising:
third ventilation means adapted to cooperate with the first ventilation means for removing the waste gases from within the first treatment zone.

28. The apparatus of claim 27 wherein the first ventilation means comprises a mechanical ventilator, the second ventilation means comprises air inlets and the third ventilation means comprises at least one ventilation conduit.

29. The apparatus of claim 22 further comprising:
collecting means for collecting excess waste water from the first waste water treatment zone to a collection chamber;
reintroducing means for reintroducing waste water from the collection chamber to one of:
the first waste water treatment zone;
at least one second waste water treatment zone.

30. The apparatus of claim 29 wherein the reintroducing means is adapted for reintroducing at least one predetermined amount of waste water from the collection chamber.

31. The apparatus of claim 29 wherein the reintroducing means is further adapted for reintroducing at least one predetermined amount of waste water from the collection chamber under pressure.

32. The apparatus of claim 22 wherein storm water and grey water are also treated along with the waste water.

33. The apparatus of claim 22 wherein the predetermined amount of waste water comprises a dose of waste water comprising a volume in the range of about 200 liters to about 8000 liters.

34. The apparatus of claim 32 wherein the apparatus is adapted to repeat the dose in a cycle ranging from about 4 times a day to about once every 7 days.

35. The apparatus of claim 22 wherein the first treatment zone is elevated above a natural ground level.

36. The apparatus of claim 22 wherein the first treatment zone comprises a core treatment zone having a prescribed material with wetted surfaces for sustaining biological processes to treat waste water.

37. The apparatus of claim 36 wherein the prescribed material comprises an aggregate material.

38. The apparatus of claim 37 wherein the aggregate has a volume comprising about 50% air.

39. The apparatus of claim 38 wherein the prescribed material comprises crushed rock.

40. The apparatus of claim 22 further comprising a perimeter treatment zone adjacent the first treatment zone for facilitating an evapotranspiration process in addition to biological processes within the first treatment zone for treating the waste water.

41. The apparatus of claim 40 wherein the perimeter treatment zone comprises one or more of:
  plants for nutrient uptake;
  a prescribed material; and
  an impervious barrier.

42. A kit of parts adapted for use in accelerating a disposal process for waste water comprising, in combination, apparatus as claimed in claim 22.

* * * * *